(No Model.)

G. B. WILDER.
SCRAPER.

No. 578,960. Patented Mar. 16, 1897.

Witnesses:
A. C. Harmon
Edward F. Allen

Inventor:
George B. Wilder
by Crosby & Gregory
attys.

UNITED STATES PATENT OFFICE.

GEORGE B. WILDER, OF CAMBRIDGE, MASSACHUSETTS.

SCRAPER.

SPECIFICATION forming part of Letters Patent No. 578,960, dated March 16, 1897.

Application filed October 13, 1896. Serial No. 608,762. (No model.)

*To all whom it may concern:*

Be it known that I, GEORGE B. WILDER, of Cambridge, in the county of Middlesex and State of Massachusetts, have invented an Improvement in Scrapers, of which the following description, in connection with the accompanying drawings, is a specification, like letters on the drawings representing like parts.

This invention has for its object the production of a novel, simple, and efficient scraper, the same having a blade which is readily adjustable as the same is worn and which is also adjustable as to its pitch or inclination.

Figure 1:
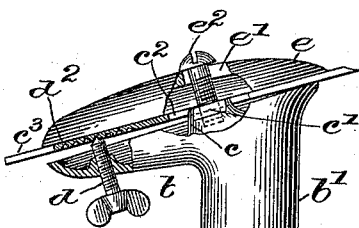
Figure 2:
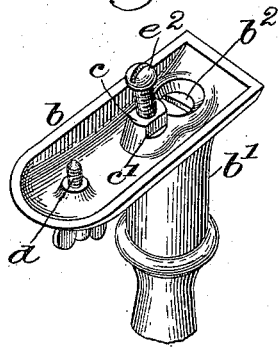
Figure 3:
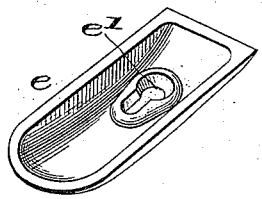
Figure 4:
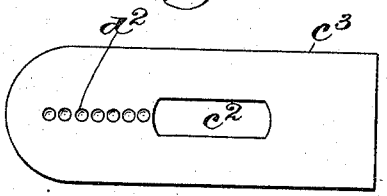

Figure 1, in side elevation, partially broken out, shows a scraper embodying my invention; Fig. 2, an interior view of the head of the scraper; Fig. 3, an interior view of the cap of the scraper, and Fig. 4 an inner side elevation of the blade.

In the drawings, A represents the scraper-handle, of wood or other suitable material, and $b$ a metallic rounded or shell-shaped body having a hollow shank $b'$ to receive the handle. The body $b$, fastened to the handle by a suitable set-screw $b^2$, has extended from it a guide-block $c$, the sides of which are slabbed off or cut away to receive an elongated opening $c^2$ in the blade $c^3$, the sides $c'$ keeping the blade in a straight line. The body $b$ is also provided with a blade-adjusting screw $d$, which preferably enters one or the other of a series of countersinks $d^2$, made in the back of the blade, the said screw, according to its position, tipping the blade more or less on the head to thus tighten the blade. It may also serve to set the beveled cutting edge of the blade at the desired angle with relation to said head. The outer side of the blade is acted on by the cap $e$, also made rounded and hollow like a shell, the cap $e$ and body $b$ together constituting the head of the scraper. The cap $e$ is provided with a tapered eye $e'$ or an eye having one of its ends of sufficient size to pass over the head of a screw $e^2$, screwed into a hole in the guide $c$, the opposite end of said eye being contracted to a diameter smaller than said head.

By making the eye of the shape shown and described it is possible to apply and remove the cap without removing its holding-screw, and to also adjust the cap without removing said screw.

The screw $e^2$ may be used alone without the thumb-screw $d$ to set and adjust the blade $c^3$. I have shown this screw $e^2$ as comparatively flat, so as to offer no obstruction to the hand, the latter conveniently grasping the rounded upper end of the head in manipulating the tool. In fact the entire head is specially formed to constitute a handhold by means of which, under the grasp of the hand, the required pressure may be brought by the tool on the paint or varnish to be scraped off.

I have shown my invention at substantially the angle preferred for scraping paint, varnish, glue, &c., but desire it to be understood that I am not limited to this angle. For smoothing work it will be desirable to vary the angle considerably.

Having described my invention, what I claim as new, and desire to secure by Letters Patent, is—

A scraper, consisting of a blade, a handle, and a two-piece head, composed of a body and a cap, the body having a hollow shank $b'$ to receive the handle, and a screw-hole in line with the end of the handle, the latter being fastened in the shank by a screw $b^2$, a guide-block $c$ extending centrally from said body adjacent said screw-hole and having its sides cut away at $c'$, said body surrounding said guide-block being hollowed and having its shell-like edges terminating in an oblong contour in a plane oblique to said handle, the rear part thereof extending from said shank to constitute a portion of a handhold and the forward part thereof ending in a straight edge substantially flush with said handle and shank, said cap being rounded and shell-like and having its edges terminating in an oblique contour in a plane to fit snugly opposite the like edges of said body, said blade having a slot $c^2$ to fit said cut-away block, a screw $e^2$, said cap and block being apertured to hold said screw, and a set-screw $d$ for adjusting said blade, said set-screw being mounted in the rear extension of said body, all substantially as described.

In testimony whereof I have signed my name to this specification in the presence of two subscribing witnesses.

GEO. B. WILDER.

Witnesses:
 GEORGE EASTMAN,
 GEORGE D. MERRILL.